United States Patent [19]

Nakazawa et al.

[11] 3,905,932

[45] Sept. 16, 1975

[54] PROCESS FOR PREPARING POLYCHLOROPRENE LATEX

[75] Inventors: Hideaki Nakazawa; Tetsuo Iikuni; Mitsumasa Akashi, all of Shin-Nanyo, Japan

[73] Assignee: Toyo Soda Manufacturing Co., Ltd., Japan

[22] Filed: Mar. 19, 1974

[21] Appl. No.: 452,608

[30] Foreign Application Priority Data
Mar. 29, 1973 Japan............................. 48-35975
Mar. 29, 1973 Japan............................. 48-35976

[52] U.S. Cl.. 260/29.7 M; 260/29.7 E; 260/29.7 H; 260/29.7 N; 260/584 B; 260/584 C
[51] Int. Cl...... C08d 1/09; C08d 3/14; C07c 93/02
[58] Field of Search .... 260/29.7 E, 29.7 N, 29.7 M, 260/29.7 H, 584 B, 584 C

[56] References Cited
UNITED STATES PATENTS

| | | | |
|---|---|---|---|
| 2,930,761 | 3/1960 | Charret | 260/584 B |
| 2,979,528 | 4/1961 | Lundsted | 260/584 B |
| 3,200,106 | 8/1965 | Dickson et al. | 260/584 B |
| 3,386,934 | 6/1968 | Aguadisch et al. | 260/29.7 M |
| 3,704,283 | 11/1972 | Mayer-Mader | 260/29.7 N |

OTHER PUBLICATIONS

Chem. Abs. 75:P111129s; 68:P106041h; 67:P109747h; 57:6083f; 52:P21027i.

Blackley, *High Polymer Latices*, I, p. 112, (Applied Science Ltd., 1966) [TJ1890B54].

*Primary Examiner*—Melvin Goldstein
*Assistant Examiner*—T. DeBenedictis, Sr.
*Attorney, Agent, or Firm*—Oblon, Fisher, Spivak, McClelland & Maier

[57] ABSTRACT

A polychloroprene latex is prepared by the addition of colloidal alumina sol and an emulsifier to chloroprene monomer with or without a comonomer.

5 Claims, No Drawings

PROCESS FOR PREPARING POLYCHLOROPRENE LATEX

BACKGROUND OF THE INVENTION

1. Field of the Invention

This invention relates to a process for preparing a cationic polychloroprene latex.

2. Description of the Prior Art

Polychloroprene is a polymer of 2-chlorobutadiene-1,3 (hereinafter referred to as chloroprene) or it may be a copolymer of 2-chlorobutadiene-1,3 and a second monomer.

It is known in the prior art that emulsion polymerization of chloroprene can be conducted in the presence of a cationic emulsifier in an acidic or a neutral system. However, it has been difficult to prepare latexes which are intended to be used for certain applications because of the limitations imposed by the properties of the commercially available emulsifiers. Moreover, a low monomer to water ratio had been required to maintain the viscosity below a maximum point during polymerization in order to assure polymerization stability.

Conventional cationic polychloroprene latexes are known to be stable over a wide pH range and are known to be stable in the presence of polyvalent metal ions. These conventional cationic polychloroprene latexes therefore have been found useful for such specialty purposes as coating cement, mortar, concrete or the like, since such surfaces are characterized by a negative charge. The cationic polychloroprene latex is, by definition, positive charged in solution, and hence, has a high affinity for such surfaces. However, conventional cationic polychloroprene latexes are too stable to coagulate easily. Prior art procedures had the disadvantage of requiring drying in a hot atmosphere or waiting for a long period of time until the water was naturally evaporated to prepare them in film or membrane form. Moreover, some of the polychloroprene films or membranes which were formed by this prior art method still contained an emulsifier in a stable form, which adversely affected the water resistance and chemical resistance of the film or membrane.

SUMMARY OF THE INVENTION

Accordingly, it is one object of this invention to provide a process for preparing a cationic polychloroprene latex wherein polymerization stability is maintained and viscosity is decreased in the polymerization.

It is another object of the invention to provide a process for preparing a cationic polychloroprene latex of a polymer which, when in film or membrane form is characterized by high weather durability, good water resistance and good chemical resistance.

It is another object of the invention to provide a process for preparing a cationic polychloroprene latex which is easily coagulated when it is applied to a material whose surface has a negative charge.

These and other objects of this invention as will hereinafter become more readily understood by the following description can be attained by polymerizing the chloroprene monomer, if preferred with a secondary comonomer, in the presence of colloidal alumina and an emulsifier of an inorganic or organic acid salt of N-alkylpropylene diaminepolyglycol ether having the formula:

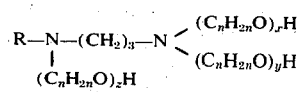

wherein R represents a $C_{12-20}$ saturated or unsaturated aliphatic hydrocarbon radical; $x$, $y$ and $z$ represent 0 or an integer and $0 < x + y + z \leq 3$; $n$ represents the integer 2 or 3.

It is further possible to prepare a sol type polychloroprene latex by adding a $C_{4-14}$ n-alkylmercaptan to said polymerization.

DETAILED DESCRIPTION OF THE PREFERRED EMBODIMENTS

The preferred dimensions of the colloidal alumina particles used in the invention are 50–100 m$\mu$ average length and 5–10 m$\mu$ average width. The alumina is in feather or fibril form which is dispersed and stabilized with an organic acid, such as a $C_{1-4}$ aliphatic acid, e.g., oxalic acid, formic acid, acetic acid propionic acid or an inorganic acid, such as hydrochloric acid, sulfuric acid, nitric acid, phosphoric acid, etc., preferably hydrochloric acid or acetic acid. Typical examples of colloidal alumina include alumina sol and baymated granulated alumina.

The colloidal alumina is added in a quantity of 0.05–5 wt percent, preferably 0.1–1.5 wt percent, as solid $Al_2O_3$ to monomer. The colloidal alumina can be prepared by adding aluminum powder to an acid solution thereby forming a solution of the aluminum salt. The salt of the N-alkylpropylenediaminepolyglycol ether used as an emulsifier in this invention has an alkyl group having 12 to 20 carbon atoms, such as lauryl, palmityl, stearyl or oleyl; or an alkyl group derived from coconut oil fatty acid, tallow oil fatty acid, hydrogenated oil fatty acid, soya-bean oil fatty acid, or rice bran oil fatty acid. Suitable organic acids are the aliphatic carboxylic acids, e.g., formic acid, acetic acid, propionic acid and oxalic acid; suitable inorganic acids are hydrochloric acid, sulfuric acid and phosphoric acid. It is preferable to use hydrochloric acid or acetic acid.

The N-alkylpropylenediaminepolyglycol ether having the formula wherein $0 < x + y + z \leq 3$ has little or no solubility in water. Hence, it has no surface activity in aqueous medium and it is difficult to use an emulsifier therein. However, when the glycol ether is used in the form of its organic or inorganic acid salt, it has a suitable solubility in water which makes it acceptable for use as an emulsifier in the polymerization of chloroprene. The polychloroprene latex prepared by using said emulsifier is stable to indefinite storage but because it is characterized by a low chemical resistance, the emulsion can easily be broken, which is one important characteristic of this invention.

When a compound having $x + y + z > 3$ is used as an emulsifier, it becomes increasingly difficult to break the emulsion, because such compounds possess high hydrophilicity and minimal cationic properties. The compound becomes less ionic with increasing chain length of the polyglycol ether and exhibits a concomitant increase in chemical stability so that the emulsion can not be as easily broken. If N-alkylpropylenediamine polyglycol ether is the only additive in the polymerization, the system will be unstable at the initial stages and side-reactions, by-product formation and difficulty in stirring will be noted. A satisfactory result thus cannot be obtained. The purpose of the addition of the colloidal alumina is to overcome this difficulty in the polymerization.

The concentration of the N-alkylpropylenediaminepolyglycol ether salt is usually 1 to 10 wt percent, preferably 2 to 6 wt percent, of the chloroprene monomer or a monomer mixture. The polymerization temperature is usually 5°–60°C, preferably 10° to 45°C. The polymerization can be carried out using any of a variety of conventional polymerization catalysts, such as the free radical catalysts or the redox polymerization catalysts commonly used for polymerization of chloroprene.

Any of a variety of comonomers can be copolymerized with the chloroprene, as is customary in the art, such as 2,3-dichlorobutadiene, styrene, acrylic acid, esters of acrylic acid, such as the methyl or ethyl esters of acrylic acid, acrylonitrile, or the like.

Any of a variety of conventional molecular weight regulators can be used in the polymerization, such as alkyl mercaptan, dialkyl xanthogen disulfide, alkylhalide, etc.

When a $C_{4-14}$, preferably a $C_{4-10}$ n-alkylmercaptan is incorporated into the polymerization sequence, it is possible to obtain a polychloroprene latex of the benzene soluble sol type. The $C_{4-14}$ n-alkylmercaptan is added preferably at a rate of 0.001–0.01 mol percent, most preferably 0.002–0.005 mole percent. The amount of the mercaptan modifier will vary depending upon the type of desired latex, whether sol or gel type. For example, when n-octylmercaptan is used as a modifier for 100 percent conversion of the chloroprene monomer, about 0.003 mole percent of the modifier is required.

It is possible to obtain a sol type polymer even when the polymerization reaches nearly 100 percent conversion. Heretofore, in order to prepare a sol type polymer latex, it has been necessary to stop the polymerization at low conversion. This technique, however, results in yields which are so low as to be disadvantageous economically and industrially. Alternatively, large amounts of modifier have been used for this purpose in the prior art. However, when said emulsifier and said molecular weight regulator are used as in the present invention, a sol type polymer latex can be easily obtained evan at high conversion, which is one of the important advantages of this invention. In general, to attain a stable polymer, it is preferable that a minimum amount of the emulsifier remain in the polychloroprene latex. However, when the amount of the emulsifier in the polymerization is too small, the polymerization stability will be too low and a coagulated polymer is formed during of after the polymerization. Accordingly, there are prescribed limits on the amount of the emulsifier which can be used. However, in accordance with this invention, the amount of the emulsifier can be decreased by adding colloidal alumina to the polymerization system, so that the industrial and economic advantages of this invention will be quite high.

Heretofore, in conventional polymerizations using various cationic surfactants, high monomer to water ratios with concomitant increase in viscosity during polymerization caused difficulty in stirring and removal of heat and was a serious problem. The reaction thus became local and inhomogeneous. Accordingly, the polymerization had to be conducted so as to maintain a low ratio of monomer to water. Conversely, in the present invention, the polymerization can be easily accomplished, even at relatively high ratios of monomer to water if the viscosity of the reaction mixture is decreased. This effect is one of the most important characteristics of this invention. In order to polymerize chloroprene in a stable manner while suppressing increases in viscosity, it was previously believed to be necessary to start the polymerization using a low concentration of emulsifier, and then to add additional amounts of emulsifier during the course of the polymerization. However, in the present invention, if the colloidal alumina is combined with the latter process, a synergistic effect is observed. In fact, when colloidal alumina is added to a polymerization system containing the emulsifiers of low emulsifying ability which ordinarily would produce poor polymers, a polychloroprene latex with excellent properties is formed.

The polychloroprene latexes prepared according to this invention possess quite satisfactory characteristics which are not exhibited by conventional cationic polychloroprene latexes. Accordingly, such a polychloroprene latex can be used for such application as in the preparation of road pavement, waterproof riverwalls, roofing, anticorrosion paints, floor-coverings or the like by bonding it to aggregates such as macadam, sand, soils, or by spraying it onto the surface of cement, concrete, metal, etc. When the polychloroprene latex of this invention is applied to a surface, the emulsion will break and a film or membrane of polychloroprene will form. The bonding or adhesion is accomplished within a short time. The polychloroprene latex prepared by this invention can be easily coagulated in alkaline solution. The coagulated latex can be used as a coating material for impregnating or coating polychloroprene onto paper, fiber and the like.

Having now generally described the invention, a further understanding can be obtained by reference to the following examples which are provided for purposes of illustration only and are not to be construed as limiting of the invention unless otherwise so specified. In the Examples, the term "part" indicates part by weight.

EXAMPLE 1

A flask equipped with a stirrer, a reflux condenser, a specific gravity meter and nitrogen gas inlet and outlet tubes was charged with 100 parts of chloroprene monomer. To this was added 130 parts of water containing 3 parts of N-oleylpropylenediaminepolypropyleneglycol ether, 2 moles of propyleneoxide adduct and hydrochloric acid required for neutralization. To this mixture 0.3 parts of alumina sol (10 wt percent of solid $Al_2O_3$)stabilized with HCl was added with high speed stirring to prepare an emulsion. To the emulsion 0.03 parts of t-butyl hydroperoxide was added and the flask was purged with nitrogen. Sodium formaldehydesulfoxylate, a reducing agent, was added dropwise to the emulsion at 40°C at the rate of 0.0025 parts/hour to induce polymerization. The degree of the polymerization was followed by monitoring the specific gravity. The addition of the reducing agent was stopped 7 hours after initiation of the reaction, and the reaction mixture was maintained at the same temperature for 12 hours. After the aging, the amount of unreacted monomer in the latex was 0.4 percent. It contained 42 percent solid components and 98 percent benzene-insoluble components.

EXAMPLE 2

A flask equipped as in Example 1 was charged with 100 parts of chloroprene monomer containing an alkyl mercaptan shown in Table 1. To this was added 130 parts of water containing 2.5 parts of an N-tallow fatty acid alkyl propylenediamine-polyethyleneglycol ether, 3.0 moles of ethyleneoxide and glacial acetic acid required for neutralization. To this mixture 0.4 parts of alumina sol (10 wt percent of solid $Al_2O_3$) stabilized with $CH_3COOH$ was added with high speed stirring to prepare an emulsion. To the emulsion 0.03 parts of t-butyl hydroperoxide was added and sodium formaldehydesulfoxylate, a reducing agent, was added dropwise at 30°C at a rate of 0.0025 parts/hour to induce polymerization. The degree of polymerization was followed by monitoring the specific gravity. The addition of the reducing agent was stopped when 99 percent conversion was achieved, and the aging of the reaction mixture was conducted at 40°C for 12 hours. The resulting latex contained 40 percent solid components. The amounts of benzene insoluble polymers in the latex are shown in Table 1.

TABLE 1

Benzene insoluble polymers in latex (%):

| mercaptan amount of addition | n-dodecyl mercaptan | n-octyl mercaptan |
|---|---|---|
| (parts by weight) | (%) | (%) |
| 0 | 95.8 | 95.8 |
| 0.05 | 92.4 | 90.5 |
| 0.10 | 89.5 | 84.5 |
| 0.20 | 87.6 | 55.4 |
| 0.30 | — | 0.2 |
| 0.415 | 80.2 | 0 *1) |
| 0.5 | — | 0 *2) |

Note: *1) viscosity average molecular weight of polychloroprene $27.9 \times 10^4$
*2) viscosity average molecular weight of polychloroprene $16.0 \times 10^4$

EXAMPLE 3

A flask equipped as in Example 1 was charged with 100 parts of chloroprene monomer containing 0.4 part of n-decylmercaptan. To this was added 125 parts of water containing 3 parts of a N-tallow fatty acid alkyl propylenediamine-polyethyleneglycol ether, 2.0 moles of ethyleneoxide and formic acid required for neutralization. To this mixture 0.5 parts of alumina sol (10 wt percent of solid $Al_2O_3$), stabilized with acetic acid, was added with high speed stirring to prepare an emulsion. To the emulsion 0.01 parts of dextrose and 0.01 parts of ferrous sulfate ($FeSO_4 \cdot 7H_2O$) were added, and t-butyl hydroperoxide, a reducing agent, was added dropwise at 30°C at a rate of 0.00012 parts/hour, to induce polymerization. The degree of polymerization was followed by monitoring the specific gravity. The addition of the reducing agent was stopped when 99 percent conversion was reached. The resulting latex contained no benzene insoluble material and the polymer had a viscosity average molecular weight of $32 \times 10^4$.

EXAMPLE 4

A flask equipped as in Example 1 was charged with 100 parts of chloroprene monomer containing 0.2 parts of n-butylmercaptan. To this was added 130 parts of water containing 3 parts of N-tallow fatty acid alkyl propylenediamine-polyethyleneglycol ether, 3.0 moles of ethylene oxide and hydrochloric acid required for neutralization. To this mixture 0.5 parts of alumina sol (10 wt percent of solid $Al_2O_3$) stabilized with HCOOH was added with high speed stirring to prepare an emulsion.

The emulsion was polymerized as in Example 2 except that the reaction was conducted at 10°C. The resulting latex contained no benzene insoluble material and the polymer had a viscosity average molecular weight of $8.0 \times 10^4$.

EXAMPLE 5

A reactor equipped with a stirrer, a reflux condenser, a specific gravity meter and nitrogen gas inlet and outlet tubes was charged with 100 parts of chloroprene monomer containing 0.35 parts of n-octylmercaptan. To this was added 125 parts of an aqueous solution containing 3 parts of tallow fatty acid alkyl propylenediamine-polyethyleneglycol, 3.0 moles of ethyleneoxide, and glacial acetic acid required for neutralization thereof (calculated from the amine value of the glycol. To this mixture 0.4 parts of alumina sol (10 wt percent of solid $Al_2O_3$) stabilized with $CH_3COOH$ was added with high speed stirring to prepare an emulsion. The reactor was purged with nitrogen, 0.015 parts of t-butyl hydroperoxide was added to the emulsion and the mixture was heated to 30°C. Sodium formaldehydesulfoxylate, a reducing agent, was added dropwise to the emulsion at a rate of 0.0025 parts per hour to initiate polymerization. The degree of polymerization was followed by monitoring the specific gravity and the viscosity of the reaction mixture was measured at each predetermined conversion stage. When conversion of chloroprene monomer reached 98 percent (after 6 hours) the addition of the reducing agent was stopped and the reaction mixture was kept at 30° for 5 hours and then allowed to cool. The amount of unreacted monomer remaining in the latex was 0.15 percent. The maximum viscosity of the reaction mixture during the polymerization was 37 cps (centipoise) and the viscosity of the final latex was 18 cps at room temperature.

REFERENCE 1

The process of Example 1 was repeated in the same reactor except that the alumina sol was omitted. As a result, when conversion reached 80 percent, the viscosity of the reaction mixture rapidly increased to 2170 cps. Therefore, it became difficult to mix uniformly. The polymerization was nevertheless continued to complete the reaction. The viscosity of the resulting final latex was 1606 cps.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing a polychloroprene latex which comprises polymerizing chloroprene in the presence of colloidal alumina sol in a quantity of 0.05–5 weight percent (as solid $Al_2O_3$) to monomer, and an emulsifier selected from inorganic or organic. Acid salt of N-alkylpropylenediamine-polyglycol ethers having the formula

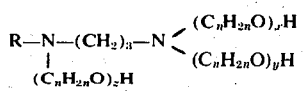

wherein R represents a $C_{12-20}$ saturated or unsaturated aliphatic hydrocarbon radical, $x$, $y$, and $z$ represent 0 or an integer and $0 < x + y + z \leq 3$, and $n$ represents the integer 2 or 3.

2. The process of claim 1 wherein a comonomer is copolymerized with chloroprene, said comonomer being selected from the group consisting of 2,3-dichlorobutadiene, styrene, acrylic acid, acrylate and acrylonitrile.

3. The process of claim 1 wherein a molecular weight regulator selected from the group consisting of alkyl mercaptan, dialkylxanthogen disulfide and alkylhalide is added to the monomer.

4. The process of claim 1, wherein said chloroprene is emulsified with water using an N-alkylpropylenediamine-polyglycol ether emulsifier in a concentration of 1 to 10 percent by weight to said monomer, and wherein an acid is added to neutralize said emulsifier, and wherein a peroxide is added to the emulsion and the polymerization is conducted by adding dropwise a reducing agent at 5° to 60°C.

5. The process of claim 1, wherein n-alkylmercaptan is admixed with the monomer.

* * * * *